(No Model.)

E. DRAULLETTE & E. CATOIS.
MOTOR VEHICLE.

No. 584,127. Patented June 8, 1897.

Witnesses.
J. C. Lebret.
O. Block.

Inventors.
Edmond Draullette,
Ernest Catois,
By A. A. de Vos.
Attorney.

UNITED STATES PATENT OFFICE.

EDMOND DRAULLETTE AND ERNEST CATOIS, OF PARIS, FRANCE.

MOTOR-VEHICLE.

SPECIFICATION forming part of Letters Patent No. 584,127, dated June 8, 1897.

Application filed October 5, 1896. Serial No. 607,883. (No model.) Patented in France August 21, 1896, No. 259,059.

*To all whom it may concern:*

Be it known that we, EDMOND DRAULLETTE and ERNEST CATOIS, citizens of the French Republic, residing at Paris, France, have invented certain new and useful Improvements in Vehicles, (for which we have obtained Letters Patent in France, dated August 21, 1896, No. 259,059,) of which the following is a specification, such as will enable others skilled in the art to which it appertains to make and use the same.

This invention relates more particularly to vehicles of the class known as "motor-vehicles" propelled by motors carried thereby, and more particularly to the subclass of such vehicles as are two-wheeled.

The vehicle of this invention consists of two wheels revolubly mounted upon suitable axle-skeins, which skeins are connected together, so that their axes are in the same plane, a motor carried by such frame, a flywheel actuated by the motor and revolving in a horizontal plane located below the axes of the wheels and mechanism connecting the motor with the wheels for actuating the same, and a suitable device for carrying freight or passengers by the frame, although it is not to be understood that the invention is limited to a vehicle necessarily comprising at once all of the devices or mechanisms before mentioned, for the invention consists in certain various combination or arrangements of devices and parts, and the construction of certain devices and parts, all substantially as is hereinafter fully described, set forth, and claimed.

The device of this invention and the mechanism thereof are more particularly set forth, shown, and described in the following specification, of which the accompanying drawings form a part, wherein similar letters of reference designate like or equivalent parts wherever found throughout the several views, and in which—

Figure 1:
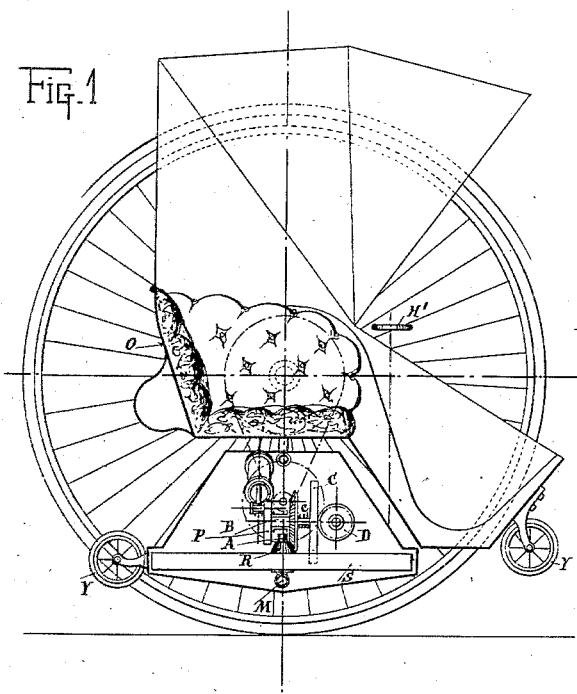
Figure 3:
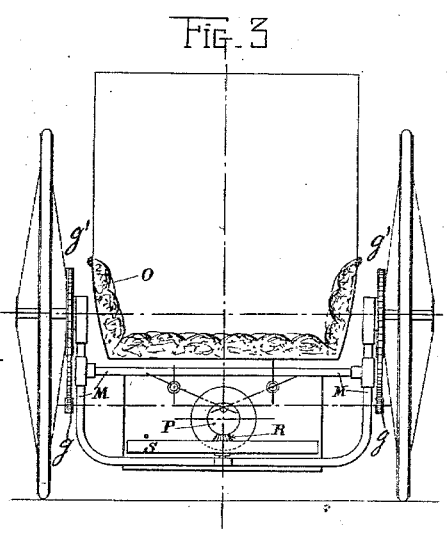
Figure 2:
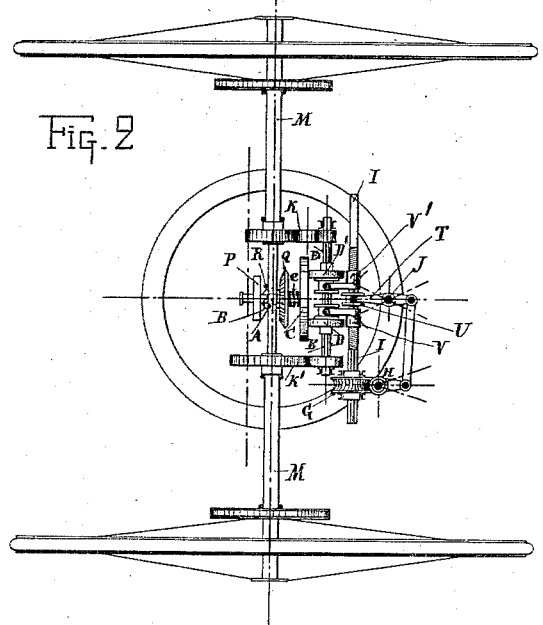

Figure 1 is a side view in central section of our improved vehicle; Fig. 2, a top plan view of the wheels and motor mechanism thereof; Fig. 3, a rear view of such vehicle; and Fig. 4, a side view of a modified form of the construction shown in Figs. 1, 2, and 3.

The particular form of the vehicle shown in the drawings, forming a part of this specification, is that of a vehicle adapted to seat two persons, and, as shown, the wheels, which are two in number, are preferably of the form common to bicycles and vehicles known as "suspension-wheels," in order to render such wheels extremely light in proportion to their size, and they are preferably provided with pneumatic or other cushion tires. Such wheels are revolubly mounted, preferably upon suitable ball or other antifriction bearings or axle-skeins, and such skeins or bearings are rigidly secured at the inner ends to the respective ends of the U-shaped frame, which is preferably formed of hollow steel or other suitable tubing, and is stiffened and braced by a suitable cross-piece of like material, and by this arrangement, while the axes of the two wheels are in the same plane, the seat of the vehicle will, as shown in Figs. 1 and 3, extend considerably below the plane of such axes.

Supported by the frame M is the motor which drives the vehicle, which may be of any desired form of construction, and the power may be derived from oil, gas, electricity, steam, or any other suitable substance. In operative connection with said motor in each case, by means of a suitable shaft, preferably hollow and mounted in suitable bearings or on a central rigid shaft, is a suitable sprocket-wheel $g$, connected, by means of a suitable sprocket-chain, with a larger sprocket-wheel $g'$, secured to the wheel of the vehicle on that side.

Mounted upon a short stud or shaft A, which stud or shaft is preferably supported upon the lower portion of the frame M, in the center thereof, is a heavy statical fly-wheel S, rotating freely upon said shaft A in a horizontal plane, and secured to said fly-wheel, so as to rotate the same, is a suitable beveled gear-wheel R, meshing with a suitable beveled gear-wheel Q, rigidly secured upon the shaft B, which is actuated from the cylinder of the motor by a suitable crank P. Also rigidly secured upon the end of the shaft B, so as to be rotated thereby, but so as to slide in and out thereon, is a brush disk or wheel C, which is kept forced firmly against the peripheries of suitable brush-wheels D and D' by means of a suitable spring $c$, interposed between the disk and the wheel Q. The brush-wheels D and D' are each mounted upon independently-revoluble shafts E and E', which are revolubly mounted in suitable end and central bearings, and while rotating therewith such wheels D and D' slide easily along such shafts E and E', and secured upon the ends of such shafts are suitable small gear-wheels in operative connection with other gear-wheels mounted upon shafts carrying the sprocket-wheels g, the gearing being such that although such brush-wheels D and D' rotate in opposite directions the wheels K and K' will be rotated in the same direction, so that through the intervening mechanism, including the sprocket chains and wheels, the supporting-wheels of the carriage will both be rotated in a forward direction.

Figure 4:
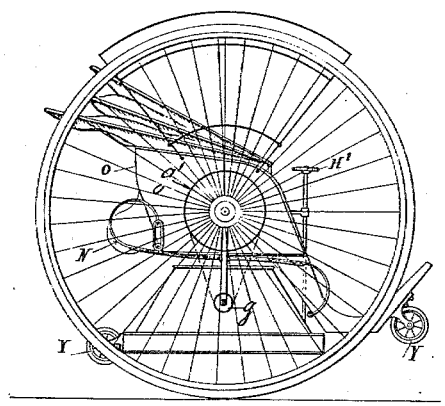

Mounted in suitable bearings parallel with the shafts E and E' and moved back and forth in such bearings by means of the lever J is the shaft I, provided with the right and left screw-threads, as shown, connected upon one side with the lever V and on the other with the lever V', provided with screw-threads in such manner that the rotating of the shaft I in one direction will move such levers V and V' toward one another and the rotating in the other direction will force them apart, and such levers being connected by suitable connections with the brush-wheels D and D'. When the shaft I is rotating in one direction by means of the hand-lever H, connected by means of an endless screw gearing with the wheel G, which rotates such shaft I, the brush-wheels D and D' will be brought closely together and the speed of each of the road-wheels will thus be lessened, whereas when the shaft I is rotating in the other direction the brush-wheels will be driven apart and toward the periphery of the disk-wheel C, whereby the speed of the vehicle will be increased, but this without change in the speed of the motor. When without disturbance of the gear-wheel G the shaft I is reciprocated back or forth in its supporting-bearings, the two brush-wheels D and D' will be moved together from one side to the other, and inasmuch as when in an exactly central position and each the same distance from the center of the wheel C each of the vehicle-wheels will be rotating at precisely the same speed the vehicle will then move forward in a straight line; but as these brush-wheels D and D' are by the movement of the lever J one or the other of them moved, the one toward and the other away from the center of the disk C, the speed of one of the vehicle-wheels will be lessened and the speed of the other increased, and consequently the vehicle will be turned to the right or left, according as to which side said brush-wheels D and D' have been shifted. In order to provide against jarring and to render the movement of the carriage easy, the seat or body portion of the carriage is preferably secured to the frame M by means of a suitable spring or springs N, as shown in Fig. 4. The motor and running mechanism are preferably inclosed in a suitable casing to exclude dust from the same, and the body of the vehicle is preferably provided at the front and rear with suitable small wheels Y to catch any rocking motion of the same and prevent friction with the ground in going over rough roads, &c. A lever (not shown) is preferably provided by which the wheel C may be forced away from the wheels D and D', and when this is done, although the motor may still be left in operation and the statical wheel S consequently in rotation, so as to preserve the equilibrium of the body of the vehicle, the vehicle will not be moved.

It will be seen upon an examination of the device that, owing to the rapid rotation of the heavy wheel S, although the vehicle has two wheels and the body of the same is supported by the axle-bearings, and partly for the reason that the weight of the motor and the center of gravity are below the supporting points and partly from the rapid rotation of the wheel S, the equilibrium of the vehicle-body will be preserved and that there will be little, if any, motion thereof, even over the roughest roads.

Having now particularly described our said invention, what we claim, and desire to secure by Letters Patent, is—

1. In a vehicle, the combination with two road-wheels having their axes in the same line, of a statical balancing-wheel rotating in a horizontal plane parallel with the axes of the wheels, and immediately below the axial line of such road-wheels, substantially as shown and described.

2. In a vehicle, the combination with a U-shaped axle-frame, of two road-wheels revolubly mounted upon the ends of the frame, and a statical wheel S rotating in a horizontal plane located below the axes of the wheels, substantially as shown and described.

3. In a vehicle, the combination with two road-wheels, of a supporting-axle for the wheels, a motor, and a statical balancing-wheel S moved by the motor and rotating in a horizontal plane, the motor and the balancing-wheel being located below the plane of the axes of the wheels, substantially as shown and described.

4. In a vehicle, the combination with two road-wheels of a brush disk or wheel C, brush-wheels D and D' in operative connection with the brush-wheel C, gearing connecting the wheel D with one of the road-wheels, and the wheel D' with the other road-wheel, and means for moving the wheels D and D' together in either direction and toward and from one another, substantially as shown and described and for the purposes set forth.

In testimony that we claim the foregoing we have hereunto set our hands this 24th day of August, 1896.

EDMOND DRAULLETTE.
   ERNEST CATOIS.

Witnesses:
 EMILE COMLUEND,
 EDWARD P. MACLEAN.